US008471870B2

United States Patent
Stringer et al.

(10) Patent No.: US 8,471,870 B2
(45) Date of Patent: Jun. 25, 2013

(54) VECTOR-BASED MAGNIFIED POINTER

(75) Inventors: Anthony Bowman Stringer, Tarpon Springs, FL (US); Garald Lee Voorhees, Tampa, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 221 days.

(21) Appl. No.: 12/828,765

(22) Filed: Jul. 1, 2010

(65) Prior Publication Data
US 2011/0004887 A1 Jan. 6, 2011

Related U.S. Application Data

(60) Provisional application No. 61/222,709, filed on Jul. 2, 2009.

(51) Int. Cl.
*G09G 5/00* (2006.01)
(52) U.S. Cl.
USPC ............ 345/660; 345/671; 345/670; 345/661
(58) Field of Classification Search
None
See application file for complete search history.

(56) References Cited

U.S. PATENT DOCUMENTS

| | | | |
|---|---|---|---|
| 6,731,315 B1 | 5/2004 | Ma et al. | |
| 2005/0285880 A1 | 12/2005 | Lai et al. | |
| 2006/0267982 A1* | 11/2006 | Aguera y Arcas | 345/428 |
| 2007/0013722 A1 | 1/2007 | Souza | |
| 2007/0013723 A1* | 1/2007 | Souza et al. | 345/660 |
| 2007/0159499 A1* | 7/2007 | Sinclair et al. | 345/660 |
| 2007/0192718 A1 | 8/2007 | Voorhees et al. | |
| 2007/0198942 A1 | 8/2007 | Morris | |
| 2010/0083192 A1* | 4/2010 | Zaman et al. | 715/866 |

OTHER PUBLICATIONS

ISR Written Opinion for PCT/US2010/040753 dated Jan. 24, 2011.
Algorithmic Implementations, Inc., ZoomText 8.1 User's Guide, 2004, pp. 38-47.
Lewis, Personal Computers; A Mouse That Does More Tricks, New York Times, Apr. 27, 1993, p. C11.
Jiji Press Ltd., NEC Launches New Software to Magnify PC Screen Text, Jiji Press Eng. News Serv., Jul. 8, 2004.
International Search Report for PCT/US2010/040753 dated Jan. 24, 2011.

* cited by examiner

*Primary Examiner* — Kee M Tung
*Assistant Examiner* — Leon T Cain, II
(74) *Attorney, Agent, or Firm* — Anton J. Hopen; Andriy Lytvyn; Smith & Hopen, P.A.

(57) ABSTRACT

A method of rendering magnified pointing indicia including the steps of monitoring application program interface messaging and intercepting a call for a unique system pointer identifier. A stored collection of predefined vector shapes is accessed and from that a predefined vector shape from the collection is selected which is correlated to the current system pointer identifier. A convergence point may be established for maximum pointing indicia magnification in addition to a user-selectable desktop magnification level. The vector shape is scaled in synchronization with the desktop magnification level up to the convergence point whereby the vector shape is no longer scaled up once the convergence point is reached. The scaled vector shape is rasterized and displayed to an end user operating a computer.

35 Claims, 12 Drawing Sheets

VECTOR-BASED MAGNIFIED POINTER

CROSS REFERENCE TO RELATED APPLICATION

This application claims priority to currently pending U.S. Provisional Patent Application Ser. No. 61/222,709 filed Jul. 2, 2009 entitled "Magnified Pointing Indicia Method," the contents of which are herein incorporated by reference.

FIELD OF INVENTION

This invention relates to magnification of computer display interfaces, and more specifically, to magnification of pointing indicia therein.

BACKGROUND OF THE INVENTION

Low vision individuals often require magnification of computer screen interfaces to discern text and images. Magnification systems may be built into the operating system itself or may comprise feature-rich, third-party products such as those sold under the MAGIC brand manufactured by Freedom Scientific, Inc., based in St. Petersburg, Fla.

A deficiency in the current state of the art is that of scaling pointing indicia such as a cursor or caret from small to large dimensions. For example, all mouse pointers have a discrete minimum and a common maximum size. The minimum size is a multiple of the system metrics for the mouse pointer. Generally, this metric is a 32×32 pixel square under operating systems sold by Microsoft Corporation out of Redmond, Wash. under the brands WINDOWS 7, VISTA, and XP. However, it is common for a mouse pointer to only occupy a 16×16 square, top-left justified, within this metric.

When the screen is magnified to a high level, such as 16-fold, the mouse pointer becomes pixelated and distracting to the user. Various smoothing techniques may be applied to reduce pixelation, but such processes consume CPU cycles and still lead to imperfect results.

Another deficiency in the current state of the art is the over-magnification of the pointing indicia. Low vision users are often limited in the magnification they can impose because the pointing indicia are magnified in step with the entire graphic user interface. Thus, at high magnification levels (i.e., exceeding 16-fold) pointing indicia become so large they obscure much of the graphic user interface itself.

SUMMARY OF INVENTION

An embodiment of the present invention provides a method of rendering a magnified pointing indicia including the steps of monitoring application program interface messaging, intercepting a call for a current system pointer identifier (such as its handle), accessing a stored collection of predefined vector shapes, selecting a predefined vector shape from the collection, the selected vector shape correlated to the system pointer identifier, scaling the vector shape to a magnification level, rasterizing the scaled vector shape, and displaying the rasterized shape. Instead of, or in addition to, passively intercepting a call for a current system pointer identifier, the operating system is actively polled as to its current settings and the current system pointer identifier is resolved.

To load mouse pointers in a Microsoft Windows environment in which the invention may be used, applications call the LoadCursor API function:

HCURSOR LoadCursor(HINSTANCE hInstance,LPCTSTR lpCursorName);

If hInstance is NULL, then lpCursorName contains an identifier representing one of the standard system cursors. These values may include:

| Value | Meaning |
|---|---|
| IDC_APPSTARTING MAKEINTRESOURCE(32650) | Standard arrow and small hourglass |
| IDC_ARROW MAKEINTRESOURCE(32512) | Standard arrow |
| IDC_CROSS MAKEINTRESOURCE(32515) | Crosshair |
| IDC_HAND MAKEINTRESOURCE(32649) | Hand |
| IDC_HELP MAKEINTRESOURCE(32651) | Arrow and question mark |
| IDC_IBEAM MAKEINTRESOURCE(32513) | I-beam |
| IDC_ICON MAKEINTRESOURCE(32641) | Obsolete for applications marked version 4.0 or later. |
| IDC_NO MAKEINTRESOURCE(32648) | Slashed circle |
| IDC_SIZE MAKEINTRESOURCE(32640) | Obsolete for applications marked version 4.0 or later. Use IDC_SIZEALL. |
| IDC_SIZEALL MAKEINTRESOURCE(32646) | Four-pointed arrow pointing north, south, east, and west |
| IDC_SIZENESW MAKEINTRESOURCE(32643) | Double-pointed arrow pointing northeast and southwest |
| IDC_SIZENS MAKEINTRESOURCE(32645) | Double-pointed arrow pointing north and south |
| IDC_SIZENWSE MAKEINTRESOURCE(32642) | Double-pointed arrow pointing northwest and southeast |
| IDC_SIZEWE MAKEINTRESOURCE(32644) | Double-pointed arrow pointing west and east |
| IDC_UPARROW MAKEINTRESOURCE(32516) | Vertical arrow |
| IDC_WAIT MAKEINTRESOURCE(32514) | Hourglass |

If hInstance is not NULL, then lpCursorName contains either a numeric or string identifier representing a graphic image contained in the application's resources. In one embodiment, the present invention creates a programmatic dictionary mapping the identifier returned by lpCursorName to a correlated vector shape (which may be of various formats including, but not limited to CGM, SVG, ODG, EPS, PDF, SWF, WMF, EMF, and XPS). The dictionary and correlation to the pointer identifier may be performed by a number of programming techniques including, but not limited to an INI file, XML file, CSV file, database engine, web-service or the like. The cursor identification to vector image may be of various relationships including many-to-one or one-to-one.

LoadCursor returns a numeric handle to the cursor that was loaded. The foreground application selects the active cursor by calling the SetCursor function. This function takes one of the HCURSOR handles previously created by LoadCursor. By intercepting both of these functions, it is possible to keep track of the active cursor being used by an application. By intercepting the SetForegroundWindow function, it is possible to determine which application is in the foreground and hence, track which application's cursor is active system-wide.

The ability to smoothly scale a mouse pointer or other graphical element is greatly enhanced by using vector-based images to create the initial, cached rasterized images that are ultimately used for final rendering (drawing to the screen). The reason for this is that the shapes and elements of the vector-based images are described by a formula, rather than by a bitmap. Currently, all mouse pointers are described by bitmaps. Bitmaps inherently become "blocky" and "stair-stepped" when magnified. And though there are post-scaling treatments that can be applied to artificially "smooth" a scaled bitmap, none produce images that are as crisp and sharply edged as images produced from a scaled vector image.

A vector-based image file such as a *.WMF file may be imported and correlated to one or more system pointer handles or identifiers. To facilitate efficiency and responsiveness, previously rasterized shapes at various magnification levels may be stored and recalled via a cache without having to scale and rasterize the shapes again. Storage of shapes are typically performed on available storage devices which may include, but are not limited to, magnetic hard drives, solid state drives and/or RAM.

An alternative embodiment of the invention includes steps for establishing a convergence point for maximum pointing indicia magnification and establishing a user-selectable desktop magnification level whereby the pointer indicia magnification and desktop magnification levels are synchronized until the convergence point is reached. After that point, the desktop magnification level may increase but the magnification of the pointing indicia remains static. When the desktop magnification level drops below the convergence point, then the pointing indicia magnification re-synchronizes with the desktop magnification level. The convergence point for decoupling and re-coupling pointer-GUI magnification may be based on a number of factors including, but not limited to, pointer overlap of available desktop space, magnification level of the GUI, the size of the pointer indicia itself, software application specific settings, event-settings (i.e., typing into a cell of a spreadsheet), keyboard and/or mouse events (i.e., mouse-wheel movement) or the like.

In an embodiment of the invention, the convergence point is at about 16-fold magnification. In another embodiment of the invention the maximum pointing indicia magnification constitutes about twenty percent of the total desktop area as calculated from the major screen dimension. For example, a desktop that is 680×480 pixels has an area of 307,200 square pixels. A pointer magnified to utilize 61,440 pixels would constitute twenty percent of the total desktop area and thus be considered a "ceiling value" to the pointer size. In yet another embodiment of the invention, the convergence point is calculated based on a percentage of screen area according to the minor screen dimension. By using the minor screen dimension, the convergence value achieves a reasonable behavior when performing in largely disproportionate screens. For example, a monitor that displays a native resolution of 1360× 768 pixels yields a major dimension almost 2× that of the minor In conditions like these, it's preferable to use the minor dimension since that ensures that the convergence value will never exceed any dimension of the display, unless explicitly requested by the user. In the above example, a convergence value of 60%, based on the major dimension, would in fact be 816 vertical pixels and exceed the whole of the minor screen dimension. In yet another embodiment of the invention the convergence point and maximum pointing indicia magnification are application-specific. For example, in a spreadsheet application, it may be necessary to establish a lower convergence point whereby the pointing indicia is relatively smaller to allow a user to view spreadsheet cells easier without overlap. Alternatively, a testing program that requires the user to select multiple choice answers might have a higher convergence point. Application-specific convergence may be preselected and/or user-defined according to the needs of the low-vision individual.

Another embodiment of the invention provides for a user-selectable desktop magnification level that is independent from a user-selectable pointing indicia magnification level. In this embodiment of the invention, the user invokes mouse, keyboard and/or other peripheral commands to modify the magnification level of the pointing indicia independently from the GUI magnification level. For example, holding down one or more keys on a keyboard while moving a mouse wheel would zoom in or zoom out the GUI, while holding down different keys while moving the mouse wheel would zoom in or zoom out only the pointing indicia. A first keystroke command may synchronize the GUI and pointing indicia magnification. A second keystroke command may de-synchronize the GUI and pointing indicia magnification.

The invention may be embodied in one or more non-transitory computer-readable media having computer-executable instructions for performing a method of running a software program on a computer, the computer operating under an operating system, the method including issuing instructions from the software program including identifying a current system pointer identifier from the operating system's application program interface, accessing a stored collection of predefined vector shapes, selecting a predefined vector shape from the collection, the selected vector shape correlated to the current system pointer identifier, scaling the vector shape to a magnification level, rasterizing the scaled vector shape, and displaying the rasterized shape. The instructions stored on the non-transitory computer-readable media execute as an application, distinct from an operating system upon which it runs and interacts at a display driver level to modify screen output. Alternatively, the non-transitory computer-readable media may include an operating system, or update thereto, to achieve the novel functionality of the present invention.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
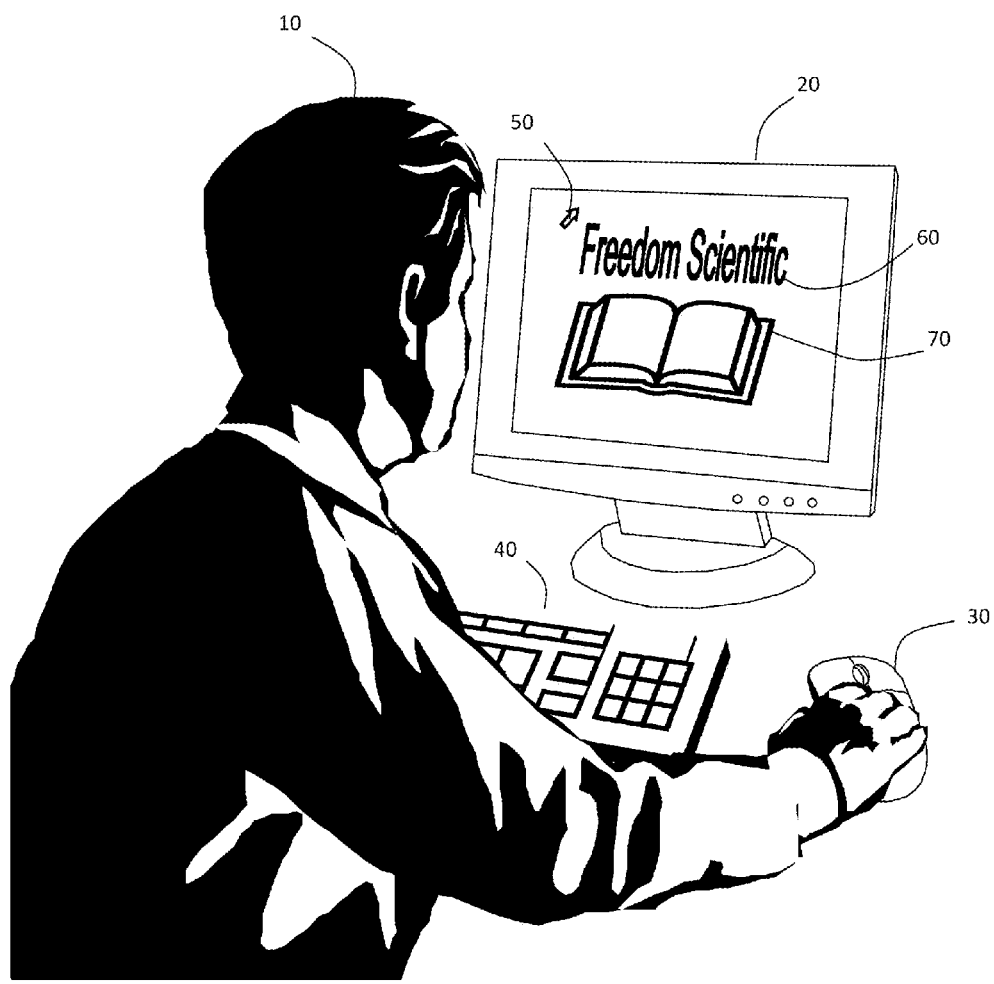
FIG. 1 is a conceptual view of an embodiment of the invention showing a low-vision user viewing a screen at 1-fold magnification.

Turning now to FIG. 1, low vision user 10 manipulates views on monitor 20 via mouse 30 and keyboard 40. Pointing indicia 50 is shown as an arrow cursor for exemplary purposes but could also be a caret. A cursor is the graphical image that represents the mouse and its movements on a Cartesian coordinate plane. It can take many shapes including, but not limited to, an arrow for pointing, a hand, an hourglass, or an I-shaped text selector. The caret, on the other hand, is the blinking indicia that is used to enter text. When low vision user 10 types on keyboard 40, the letter appears at the caret, and the caret moves forward by 1 space. To view the relative magnification levels, display text 60 and display graphic 70 are provided in FIG. 1.

Figure 2:
FIG. 2 is a conceptual view of an embodiment of the invention showing a low-vision user viewing a screen at 2-fold magnification.
Figure 3:
FIG. 3 is a conceptual view of an embodiment of the invention showing a low-vision user viewing a screen at 4-fold magnification.
Figure 4:
FIGS. 4-5 area conceptual views of an embodiment of the invention showing a low-vision user viewing a screen at 16-fold magnification.

FIG. 1 shows the GUI, pointing indicia 50, display text 60 and display graphic 70 unmagnified. In FIG. 2, pointing indicia 50, display text 60 and display graphic 70 are shown, conceptually, at a 2-fold magnification level. In FIG. 3, pointing indicia 50, display text 60 and display graphic 70 are shown, conceptually, at a 4-fold magnification level. In FIG. 4, pointing indicia 50, display text 60 and display graphic 70 are shown, conceptually, at a 16-fold magnification level. At this level, pointing indicia 50 overlaps approximately twenty percent of the GUI area. According to an embodiment of the present invention, additional magnification of GUI and display text 60 de-couples the previously synchronized magnification of GUI and pointing indicia 50. The size of pointing indicia 50 remains constant as the magnification of display text 60 continues past 16-fold magnification.

Figure 5:

In FIG. 5, the magnification of the pointing indicia 50 is de-coupled from the magnification of the GUI. GUI is magnified to 16-fold while pointing indicia 50 is magnified to only 4-fold. Low vision user 10 may de-couple magnification between pointing indicia 50 and GUI using keyboard 40, mouse 30, or a combination thereof. Other peripherals and input systems such as voice recognition systems may be used to effectuate the event. The de-coupling may also be automatically and intelligently achieved by the invention. For example, a predetermined threshold of mouse inactivity may be detected to incrementally increase or decrease (as desired) pointing indicia 50 magnification.

Mouse inactivity with extrinsic data may be used to make intelligent magnification decisions. For example, if a large amount of text is detected on the GUI in conjunction with mouse inactivity, a presumption may be made that the user is reading the text. In such case, a highly magnified cursor would only obscure text viewing. Alternatively, mouse 30 movement immediately after a period of mouse inactivity may invoke a rapid, stepped magnification of the pointing indicia 50 so that it can be easily located by low vision user as he resumes use of pointing indicia 50. The stepped magnification may be used to provide an animated effect. In other cases, a plurality of incrementally modified vector shapes may provide other animation effects such a movement, rotation, waveforms and the like. As the shapes are vector-based, sized up to the magnification level, rasterized and cached, the quality of the graphic and the efficiency of cycling the cached images provide a substantial advantage over the current state of the art.

Yet another embodiment of the invention includes the step of algorithmically detecting erratic movements of mouse 30 by low vision user 10 following a period of mouse 30 inactivity which is indicative of difficulty in find the location of pointing indicia 50. Erratic movement may include, but are not limited to, rapid side-to-side movement and circular movement. Responsive to detection of erratic movements, pointing indicia 50 is magnified according to the invention for a predetermined time period then returned to its preselected magnification level. An advantage of this embodiment over the prior art is that erratic movement must follow a predetermined period of inactivity as mouse movement perceived as "erratic" may be intentional should the user be engaged in a software application that calls for such movement.

Figure 6:
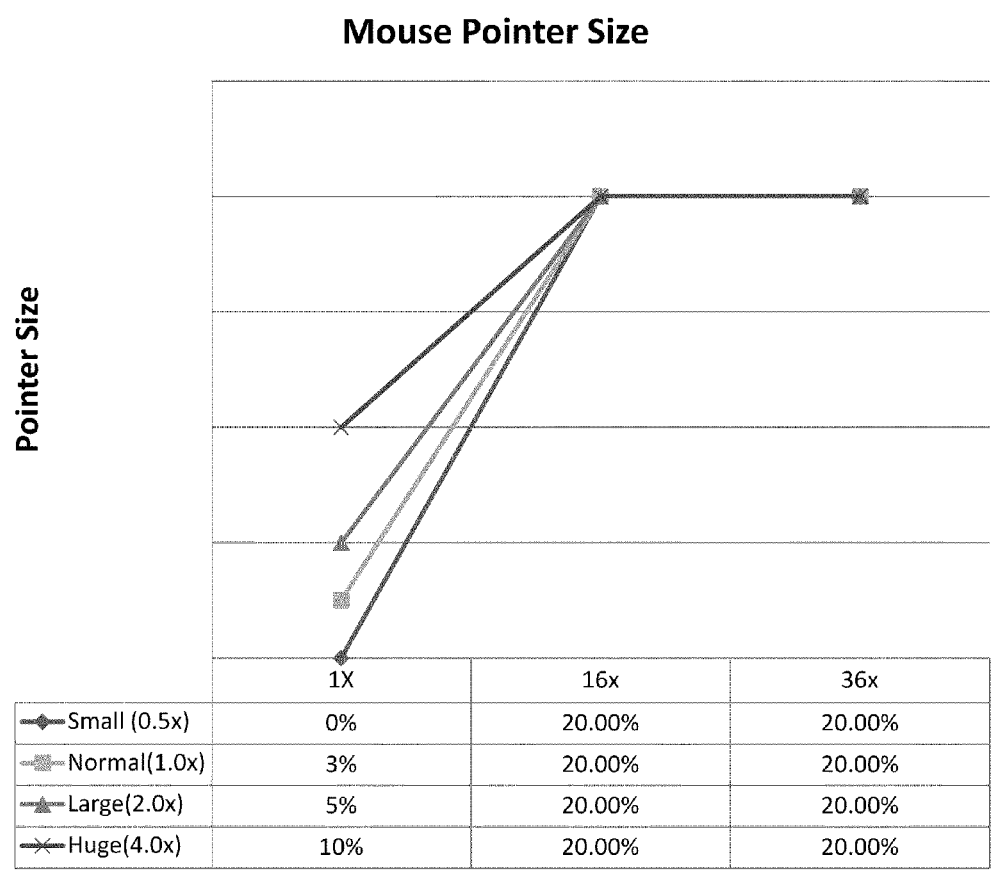
FIG. 6 is a graph showing a convergence point for maximum pointer indicia size at 16-fold magnification.

FIG. 6 illustrates a convergence graph showing four (4) different pointer sizes denoted as small (♦), normal (■), large (▲) and huge (x). Small pointer size value is 0.5×. Normal pointer size value is 1.0×. Large pointer size value is 2.0×. Huge pointer size value is 4.0×. At a 1-fold magnification of the GUI, small, normal, large and huge pointer sizes cover an area of the GUI of ~0%, 3%, 5% and 10% respectively. As magnification of the GUI is increased, the variation in point sizes would produce drastically different user experiences. However, under an embodiment of the present invention, these pointer sizes are normalized at a 16-fold GUI magnification. As the GUI is magnified from 1-fold to 16-fold, small pointer size is increased substantially more relative to huge pointer size. Other magnification levels may also be selected for convergence.

Figure 7:
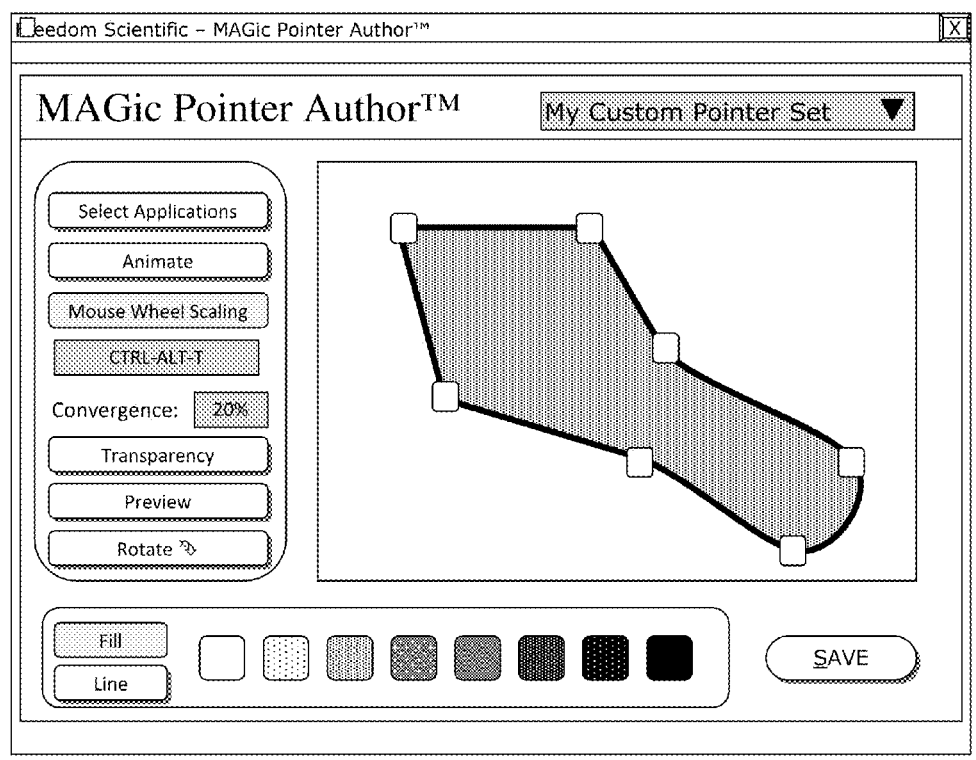
FIG. 7 is a graphic user interface for customizing a mouse pointer.

Turning to FIG. 7, a pointer authoring application is anticipated by the present invention to enable users to create vector shapes and assign them to pointer sets or individual pointers. Pointer sets contain collections of different graphic images for pointer cursor that change depending on the circumstances in which they are displayed. When selecting text to edit, a cursor may change to a vertical bar (I-beam). When panning around a document, the cursor may appear as a hand. Graphic-editing cursors may appear as pencils, brushes and paint buckets depending on the function. When waiting for an operation to finish, a "wait" image may appear such as an hourglass or clock. Other pointing options include selecting fill and line appearances for color, patterns, transparency and the like. Shapes may be assigned specific software applications. This may be accomplished by inspecting the operating system messaging to identify which application gains focus and applying the appropriate pointer set and/or cursor modification as desired. Because the present method allows the rapid, clean rendering of sharp and clear images at any dimension, animating the pointer cursor is possible. A sequence of stylizations and/or changes in dimension in the vector shape may be cached whereby the cursor may appear animated as the sequence is displayed. Mouse wheel scaling parameters and hot-key combinations may be assigned to specific shapes and/or sets. For example, a user may hold down a keyboard combination while scrolling the mouse wheel in different directions to scale up or down the pointer cursor.

Figure 8:
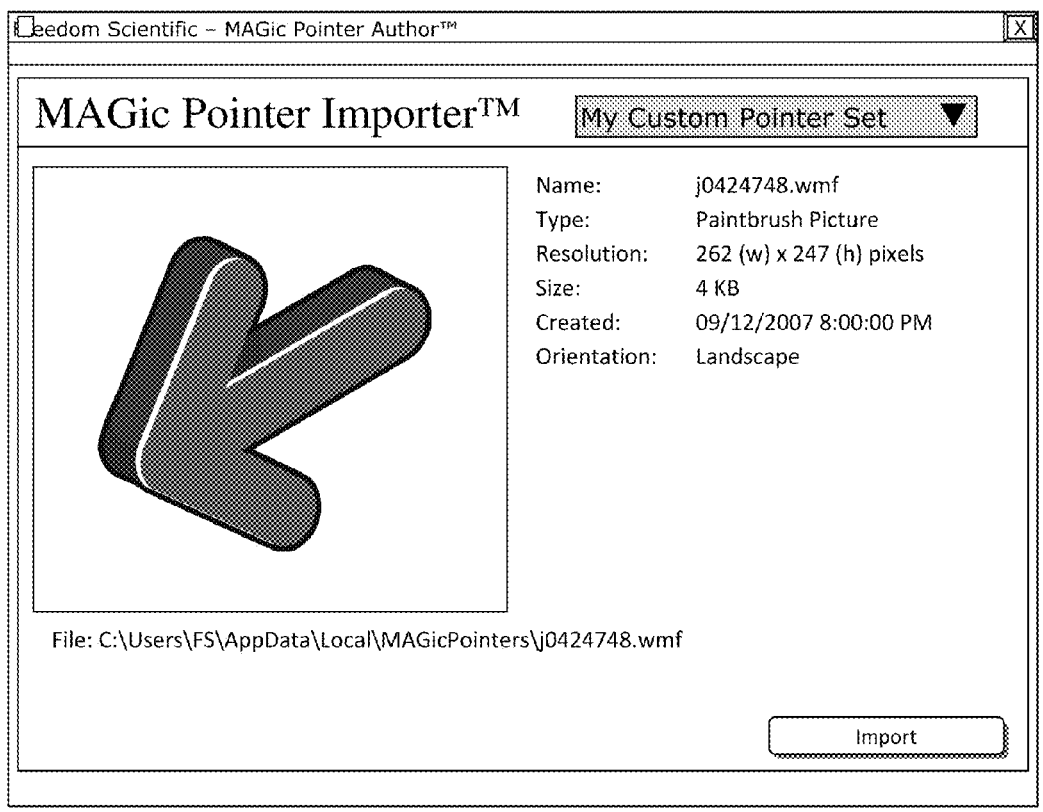
FIG. 8 is a graphic user interface for importing vector based files and assigning them as pointing indicia.

FIG. 8 shows an import application for assigning any vector-based graphic file to a specific pointer and/or pointer set. Vector file formats may include, but are not limited to, computer graphics metafile (CGM), scalable vector graphics (SVG), OpenDocument graphics (ODG), encapsulated postscript (EPS), portable document format (PDF), small web format (SWF), Windows metafile (WMF), Windows enhanced metafile (EMF), and XML paper specification (XPS). Another advantage of the present invention is that low-vision users are more likely to have a large collection of preexisting vector art to utilize as pointing indicia at any magnification level. In contradistinction, rasterized images are difficult to increase in size while maintaining clarity and sharpness due to pixelation of the bit-mapped image.

Figure 9:
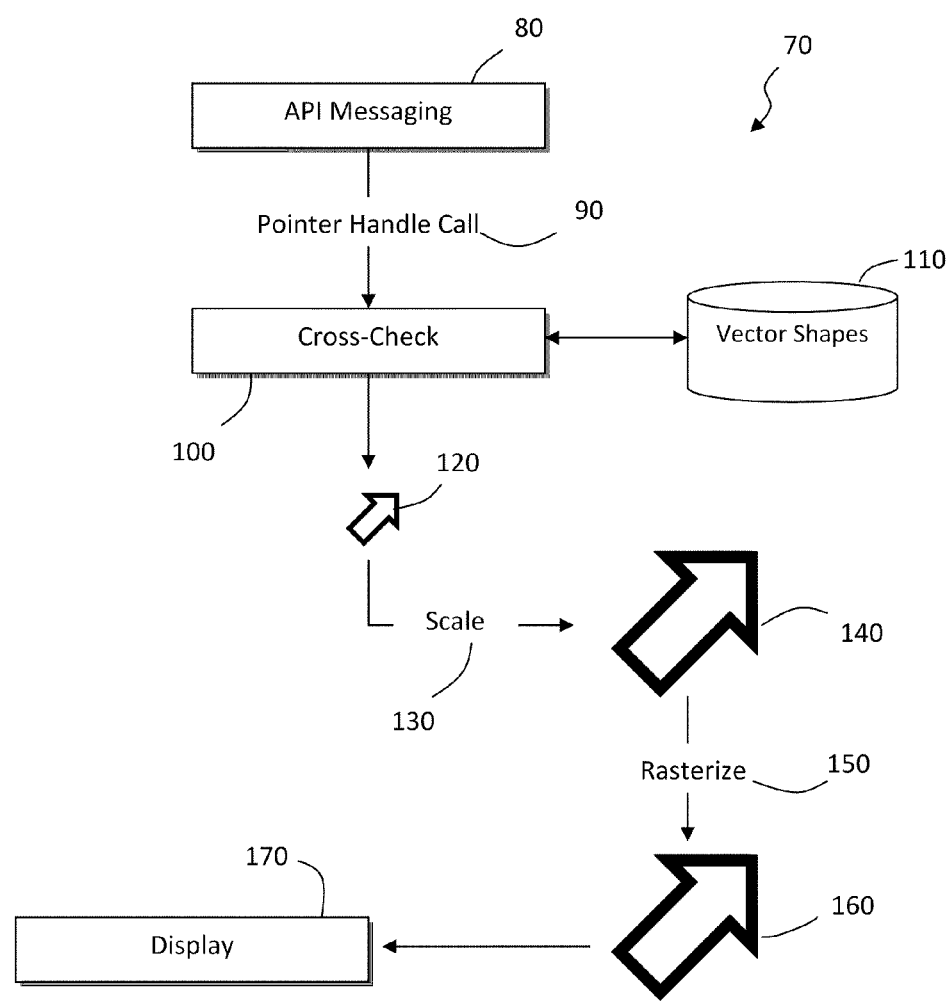
FIG. 9 is a diagrammatic view of an embodiment of the invention.

In FIG. 9, an embodiment of the invention is shown as process 70. API messaging 80 is monitored for pointer handle call 90. Cross-check 100 is made against vector shape database 110 to match pointer handle call 90 with a preexisting shape in vector shape database 110. Vector shape database 110 contains one or more vector shapes stored in memory. Database 110 may be a file directory, a structured file such as XML, a fully relational database or the like. Vector shape database 110 associates pointer handle call 90 with a correlated vector image. For example, if pointer handle call 90 requests a hand cursor image, cross-check 100 determines whether a vector image exists for the hand cursor image. If not, then a bit-mapped image is scaled up and smoothed. However, if a vector image does exist, then it is scaled up to the appropriate magnification level and then rasterized into a bitmap. Vector shape 120 is retrieved and scaling function 130 is applied to produce magnified vector shape 140. Scaling is performed on a vector image by increasing or decreasing the length and width of the image. Because the scaling is done on a vector image, there is no pixelation as would be seen in bit-mapped scaling. Rasterizing process 150 is applied to magnified vector shape 140 to produce rasterized shape 160 which is then displayed 170 as the pointing indicia.

Figure 10:
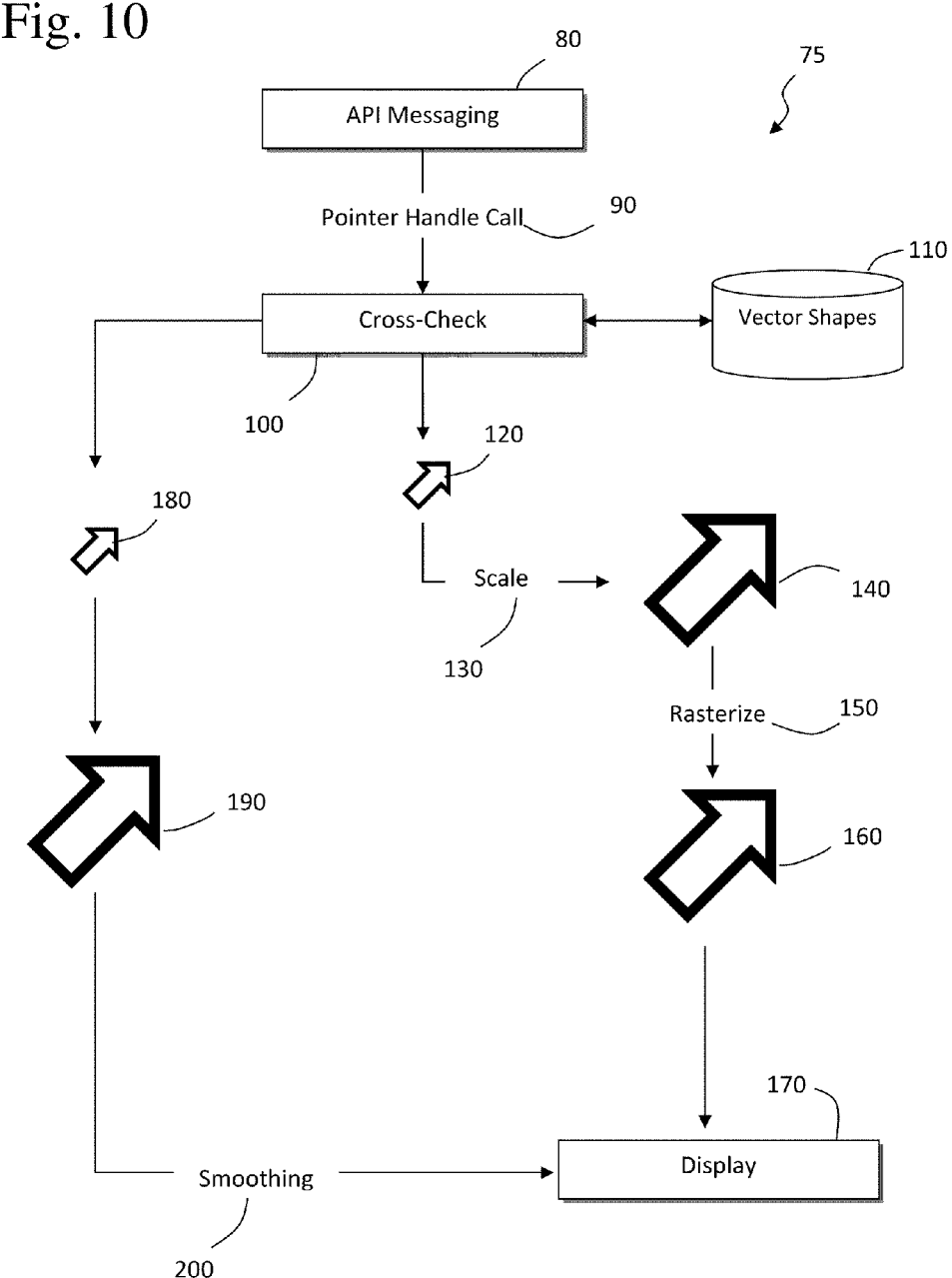
FIG. 10 is a diagrammatic view of an embodiment of the invention.

FIG. 10 illustrates an alternative embodiment of the invention (denoted as process 75) that accommodates pointer handle calls 90 that do not have a corresponding shape in vector shape database 110. In the event a match is not made, default bitmapped pointing indicia 180 is magnified to enlarged bitmapped pointing indicia 190. Smoothing processing 200 is applied to enlarged bitmapped pointing indicia 190 and then displayed 170. In another embodiment of the invention, upon finding no match for a vector shape, the system prompts low vision user 10 to associate an existing vector shape, create a new vector shape or import a vector-based file as a replacement for default bitmapped pointing indicia 180. In yet another embodiment of the invention, a default vector shape is provided for pointer handle calls 90 that lack a corresponding shape in vector shape database 110.

Figure 11:
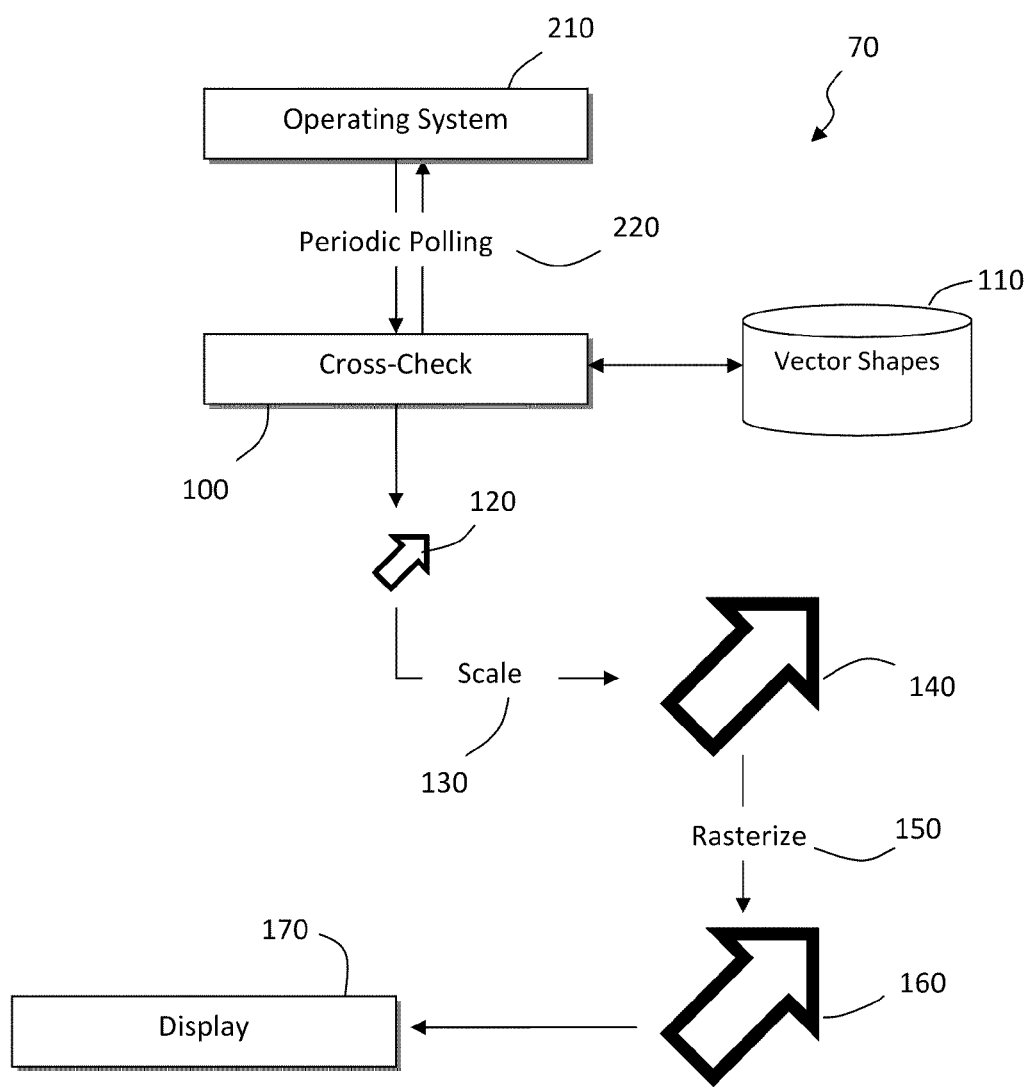
FIG. 11 is a diagrammatic view of an embodiment of the invention showing periodic polling of the operating system to obtain the current pointing indicia settings.

FIG. 11 illustrates periodic polling 220 of operating system 210 to obtain the current pointing indicia settings. Upon retrieving these settings, the predefined vector shape is selected that is correlated with the polled indicia settings.

Figure 12:
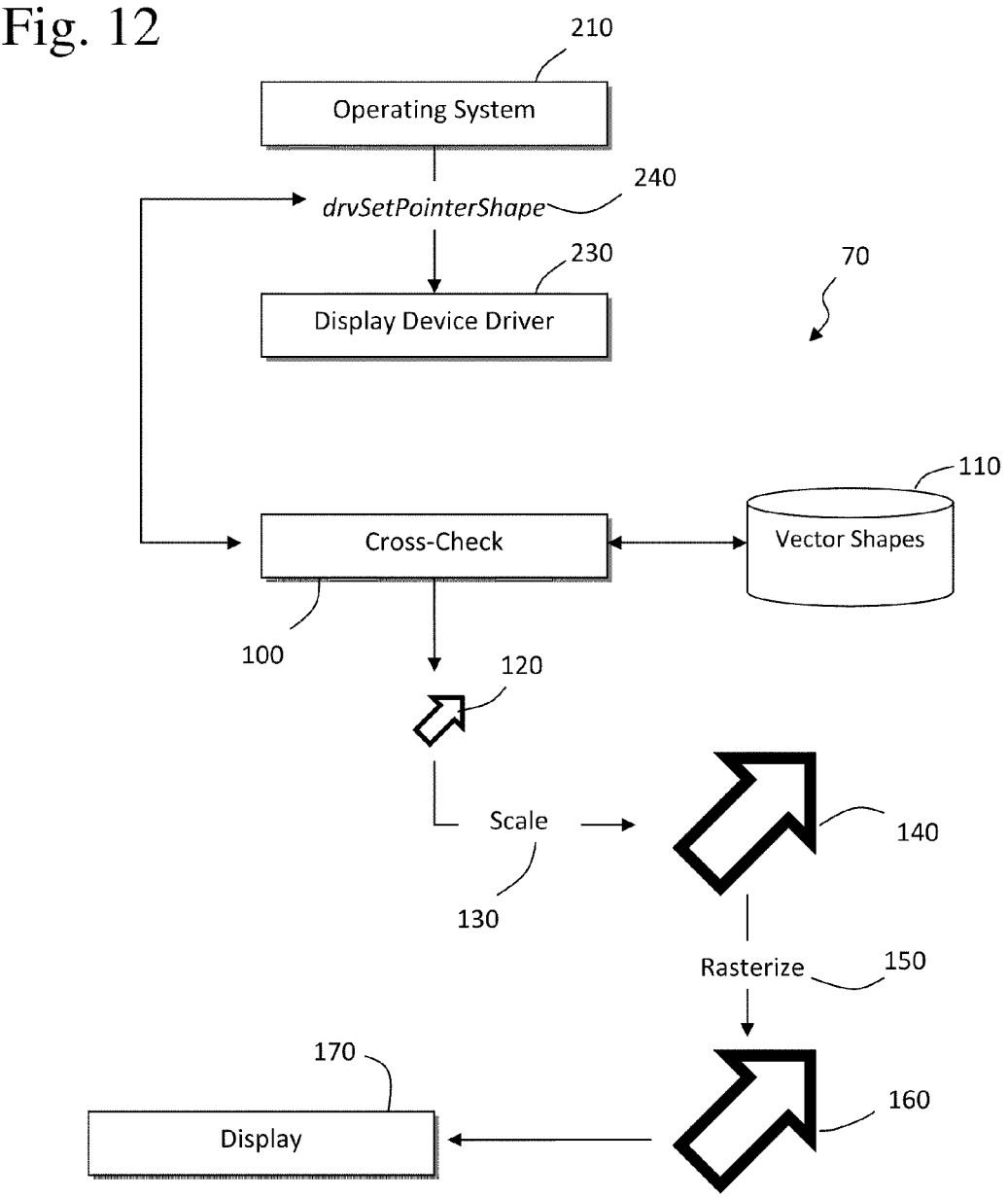
FIG. 12 is a diagrammatic view of an embodiment of the invention showing interception of dvrSetPointerShape between the operating system and the display device driver to obtain the current pointing indicia settings.

In FIG. 12, an alternative method of obtaining the pointer shape includes the step of intercepting drvSetPointerShape value 240 between operating system 210 and display device driver 230. The drvSetPointerShape value 240 is cross-checked 100 to see if there is a correlated vector shape 110 that is indexed to drvSetPointerShape value 240. Using drvSetPointerShape value 240 is most appropriate for the fifteen (15) predefined (non-obsolete) cursor types available in the MICROSOFT WINDOWS application programming interface specification.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of magnifying pointing indicia comprising the steps of:
   identifying a current system pointer identifier from an operating system's application program interface;
   accessing a stored collection of predefined pointing indicia vector shapes;
   selecting a predefined vector shape from the collection, the selected vector shape correlated to the current system pointer identifier;
   scaling the vector shape to a magnification level;
   rasterizing the scaled vector shape; and
   rendering a magnified pointing indicium by displaying the rasterized shape, wherein the pointing indicium is magnified independently of background content.

2. The method of claim 1 further comprising the steps of importing a vector-based image file and correlating the vector-based image file to one or more unique system pointer identifiers.

3. The method of claim 1 wherein the step of identifying the current system pointer identifier comprises the steps of periodically polling the operating system for its current pointing indicia settings and selecting the predefined vector shape that is correlated with the polled pointing indicia settings.

4. The method of claim 1 wherein the step of identifying the system pointer identifier comprises the steps of monitoring the operating system's application program interface messaging, intercepting a call for the current system pointer identifier, and correlating the selected vector shape to the intercepted system pointer identifier.

5. The method of claim 1 wherein the step of identifying the system pointer identifier comprises the steps of monitoring communications to the display device driver, intercepting a call for the current system pointer identifier, and correlating the selected vector shape to the intercepted system pointer identifier.

6. The method of claim 1 further comprising the step of caching rasterized shapes for reuse.

7. A method of magnifying pointing indicia comprising the steps of:
   identifying a current system pointer identifier from an operating system's application program interface;
   accessing a stored collection of predefined pointer indicia vector shapes;
   selecting a predefined vector shape from the collection, the selected vector shape correlated to the current system pointer identifier;

establishing a convergence point for maximum pointing indicia magnification, the convergence point being the magnification level above which magnification of a pointing indicium and background content become decoupled;

establishing a desktop magnification level;

scaling the vector shape in synchronization with the desktop magnification level up to the convergence point whereby the vector shape is no longer scaled up once the convergence point is reached, wherein only the background content is magnified above the convergence point while the vector shape remains the same size so as not to obstruct the background content;

resynchronizing scaling the vector shape and the background content when the magnification level falls below the convergence point;

rasterizing the scaled vector shape; and rendering a magnified pointing indicium by displaying the rasterized shape.

8. The method of claim 7 wherein the step of identifying the current system pointer identifier comprises the steps of periodically polling the operating system for its current pointing indicia settings and selecting the predefined vector shape that is correlated with the polled pointing indicia settings.

9. The method of claim 7 wherein the step of identifying the current system pointer identifier comprises the steps of monitoring the operating system's application program interface messaging, intercepting a call for the current system pointer identifier, and correlating the selected vector shape to the intercepted system pointer identifier.

10. The method of claim 7 wherein the step of identifying the system pointer identifier comprises the steps of monitoring communications to the display device driver, intercepting a call for the current system pointer identifier, and correlating the selected vector shape to the intercepted system pointer identifier.

11. The method of claim 7 wherein the convergence point is at about 16-fold magnification.

12. The method of claim 7 wherein the maximum pointing indicia magnification constitutes about twenty percent of the total desktop area as calculated from the minor screen dimension.

13. The method of claim 7 wherein the convergence point and maximum pointing indicia magnification are application-specific.

14. The method of claim 7 further comprising the steps of importing a vector-based image file and correlating the vector-based image file to one or more system pointer identifiers.

15. The method of claim 7 further comprising the step of caching rasterized shapes for reuse.

16. A method of magnifying pointing indicia comprising the steps of:

identifying a current system pointer identifier from an operating system's application program interface;

accessing a stored collection of predefined pointer indicia vector shapes;

selecting a predefined vector shape from the collection, the selected vector shape correlated to the current system pointer identifier;

establishing a desktop magnification level;

establishing a user-selectable pointing indicia magnification level, wherein the pointing indicia magnification level is independent of the desktop magnification level;

scaling the vector shape according to the pointing indicia magnification level;

rasterizing the scaled vector shape; and rendering a magnified pointing indicium by displaying the rasterized shape.

17. The method of claim 16 wherein the step of identifying the current system pointer identifier comprises the steps of periodically polling the operating system for its current pointing indicia settings and selecting the predefined vector shape that is correlated with the polled pointing indicia settings.

18. The method of claim 16 wherein the step of identifying the current system pointer identifier comprises the steps of monitoring the operating system's application program interface messaging, intercepting a call for the current system pointer identifier, and correlating the selected vector shape to the intercepted system pointer identifier.

19. The method of claim 16 wherein the step of identifying the system pointer identifier comprises the steps of monitoring communications to the display device driver, intercepting a call for the current system pointer identifier, and correlating the selected vector shape to the intercepted system pointer identifier.

20. The method of claim 16 wherein the step of establishing a user-selectable pointing indicia magnification level is performed responsive to a mouse-wheel event.

21. The method of claim 16 wherein the step of establishing a user-selectable pointing indicia magnification level is performed responsive to a keystroke event.

22. The method of claim 16 further comprising the steps of importing a vector-based image file and correlating the vector-based image file to one or more system pointer identifiers.

23. The method of claim 16 further comprising the step of caching rasterized shapes for reuse.

24. A method of magnifying pointing indicia comprising the steps of:

identifying a current system pointer identifier from an operating system's application program interface;

accessing a stored collection of predefined pointer indicia vector shapes;

selecting a predefined vector shape from the collection, the selected vector shape correlated to the current system pointer identifier;

automatically establishing a pointing indicia magnification level for a preselected software application based on a type of the software application;

scaling the vector shape according to the pointing indicia magnification level responsive to activity associated with the preselected software application, wherein the vector shape is scaled independently from background content;

rasterizing the scaled vector shape; and rendering a magnified pointing indicium by displaying the rasterized shape.

25. The method of claim 24 wherein the step of identifying the current system pointer identifier comprises the steps of periodically polling the operating system for its current pointing indicia settings and selecting the predefined vector shape that is correlated with the polled pointing indicia settings.

26. The method of claim 24 wherein the step of identifying the current system pointer identifier comprises the steps of monitoring the operating system's application program interface messaging, intercepting a call for the current system pointer identifier, and correlating the selected vector shape to the intercepted system pointer identifier.

27. The method of claim 24 wherein the step of identifying the system pointer identifier comprises the steps of monitoring communications to the display device driver, intercepting a call for the current system pointer identifier, and correlating the selected vector shape to the intercepted system pointer identifier.

28. The method of claim 24 wherein the step of establishing a user-selectable pointing indicia magnification level is performed responsive to a mouse-wheel event.

29. The method of claim 24 wherein the step of establishing a user-selectable pointing indicia magnification level is performed responsive to a keystroke event.

30. The method of claim 24 further comprising the steps of importing a vector-based image file and correlating the vector-based image file to one or more unique system pointer identifiers.

31. The method of claim 24 further comprising the step of caching rasterized shapes for reuse.

32. One or more non-transitory computer-readable media having computer-executable instructions for performing a method of running a software program on a computer, the computer operating under an operating system, the method including issuing instructions from the software program comprising:
  identifying a current system pointer identifier from the operating system's application program interface;
  accessing a stored collection of predefined pointing indicia vector shapes;
  selecting a predefined vector shape from the collection, the selected vector shape correlated to the current system pointer identifier;
  scaling the vector shape to a magnification level;
  rasterizing the scaled vector shape; and
  rendering a magnified pointing indicium by displaying the rasterized shape, wherein the pointing indicium is magnified independently from other content displayed on a screen.

33. The one or more non-transitory computer-readable media of claim 32 wherein the step of identifying the system pointer identifier comprises the steps of periodically polling the operating system for its current pointing indicia settings and selecting the predefined vector shape that is correlated with the polled pointing indicia settings.

34. The one or more non-transitory computer-readable media of claim 32 wherein the step of identifying the current system pointer identifier comprises the steps of monitoring the operating system's application program interface messaging, intercepting a call for the current system pointer identifier, and correlating the selected vector shape to the intercepted system pointer identifier.

35. The one or more non-transitory computer-readable media of claim 32 wherein the step of identifying the current system pointer identifier comprises the steps of monitoring communications to the display device driver, intercepting a call for the current system pointer identifier, and correlating the selected vector shape to the intercepted system pointer identifier.

* * * * *